United States Patent [19]

Davis

[11] 4,172,557
[45] Oct. 30, 1979

[54] AIR SPRAYER APPARATUS FOR VINEYARDS AND THE LIKE

[75] Inventor: Charles H. Davis, Orlando, Fla.

[73] Assignee: FMC Corporation, San Jose, Calif.

[21] Appl. No.: 930,455

[22] Filed: Aug. 2, 1978

[51] Int. Cl.² .......................................... B05B 7/26
[52] U.S. Cl. .................................................. 239/77
[58] Field of Search ................................. 239/77, 78

[56] References Cited

U.S. PATENT DOCUMENTS

| | | |
|---|---|---|
| 668,950 | 2/1901 | Brakeley et al. |
| 1,499,894 | 7/1924 | Waterman . |
| 2,184,109 | 12/1939 | Ames . |
| 2,369,303 | 2/1945 | Kurth et al. |
| 2,801,044 | 7/1957 | Bowie . |
| 2,976,647 | 3/1961 | Pickrell . |
| 3,055,145 | 9/1962 | Lindsay . |
| 3,164,324 | 1/1965 | Bruinsma . |
| 3,269,657 | 8/1966 | Ballu . |
| 3,384,305 | 5/1968 | Bent . |
| 3,385,521 | 5/1968 | Ballu . |
| 3,599,866 | 8/1971 | Bolton . |

OTHER PUBLICATIONS

"Marwald's Kinkelder: Low Volume Sprayers Cut Costs With Better Penetration and Coverage!", Marwald Ltd., Trade Literature, 2 pp.
"Marwald's Kinkelder: The Best Low Volume Sprayers", Marwald Ltd., Trade Literature, 2 pp.
"Program Your Coverage With the AgTec Spray Distribution System", AgChem Equipment Co., Inc., Trade Literature, 4 pp.
"PTO Model 3002", AgTec Division of AgChem Equipment Co., Inc., Trade Literature, 2 pp.
"Orchard, Grove, and Vineyard Air Sprayers. Machinery You Can Grow On," FMC Corp., Trade Literature, 12 pp.

*Primary Examiner*—Robert W. Saifer
*Attorney, Agent, or Firm*—R. S. Kelly; T. J. McNaughton; J. F. Verhoeven

[57] ABSTRACT

A vineyard air sprayer includes an axial fan type of blower assembly which is vertically mounted upon a trailer rearwardly of a spray tank. The blower assembly has a cylindrical outer shell having an annular discharge ring mounted to the bottom end thereof. An inner shell is coaxially mounted within the outer shell, and a truncated annular diffuser is secured to the bottom end of the inner shell in a coaxial relationship therewith. The outer edge of the diffuser is spaced from the outer edge of the discharge ring to form two arcuate discharge openings at opposite sides of the blower assembly. The diffuser includes an upwardly projecting annular lip portion which is truncated by a vertical wall at its front end. The edge of the lip at each side of the diffuser is cut along a convolute helical path so as to be highest at the rear end of each discharge opening, to slope downwardly and forwardly therefrom to a point where the lip is notched away, and to slope upwardly from such notched portion until its juncture with the vertical wall at the front of the discharge opening. Spray nozzles are positioned in each discharge opening to deliver atomized spray solution to the air blast emanating therefrom. The air blast generated from each discharge opening is moderated by the convolute helical edge of the diffuser so as to impinge upon the foliage being sprayed with varying angles of impingement as the sprayer is pulled by such foliage.

16 Claims, 7 Drawing Figures

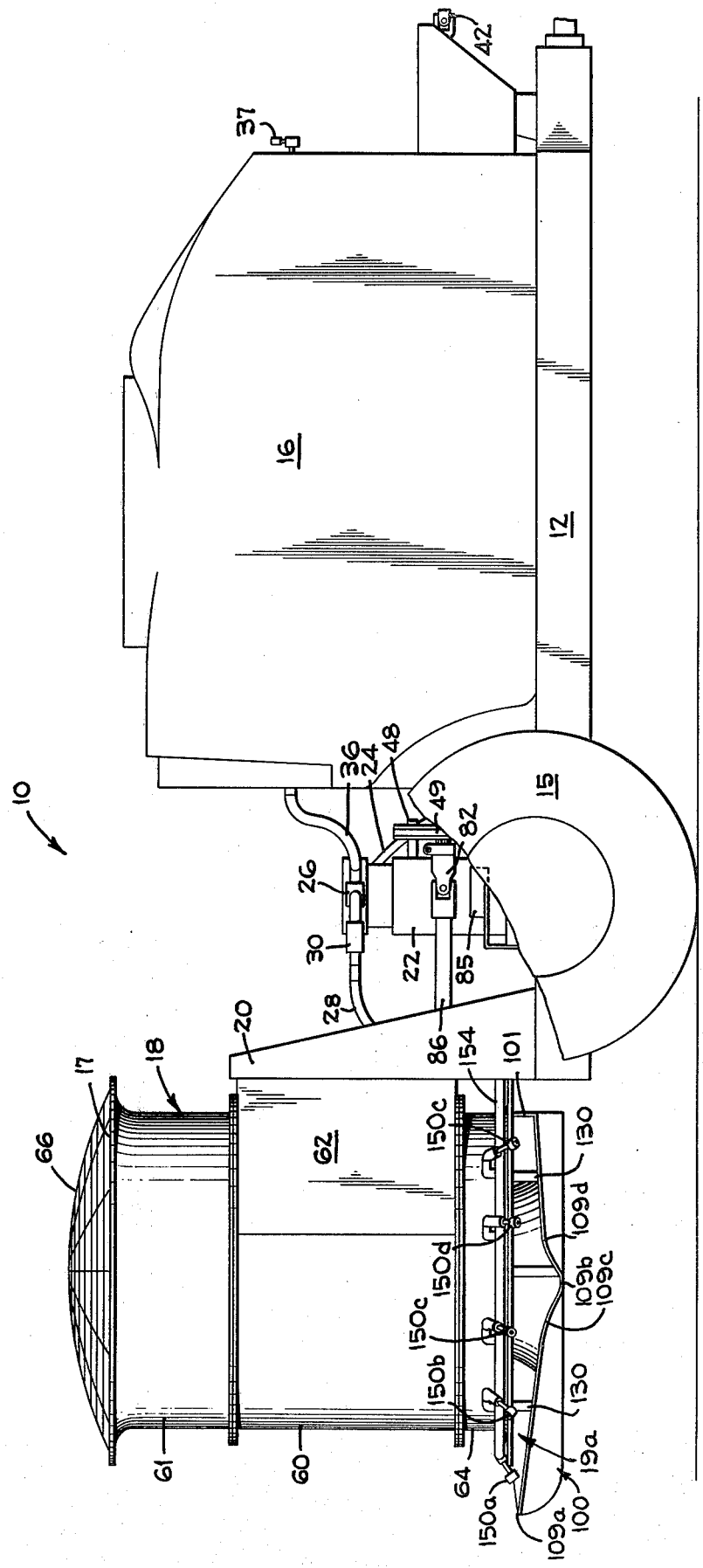

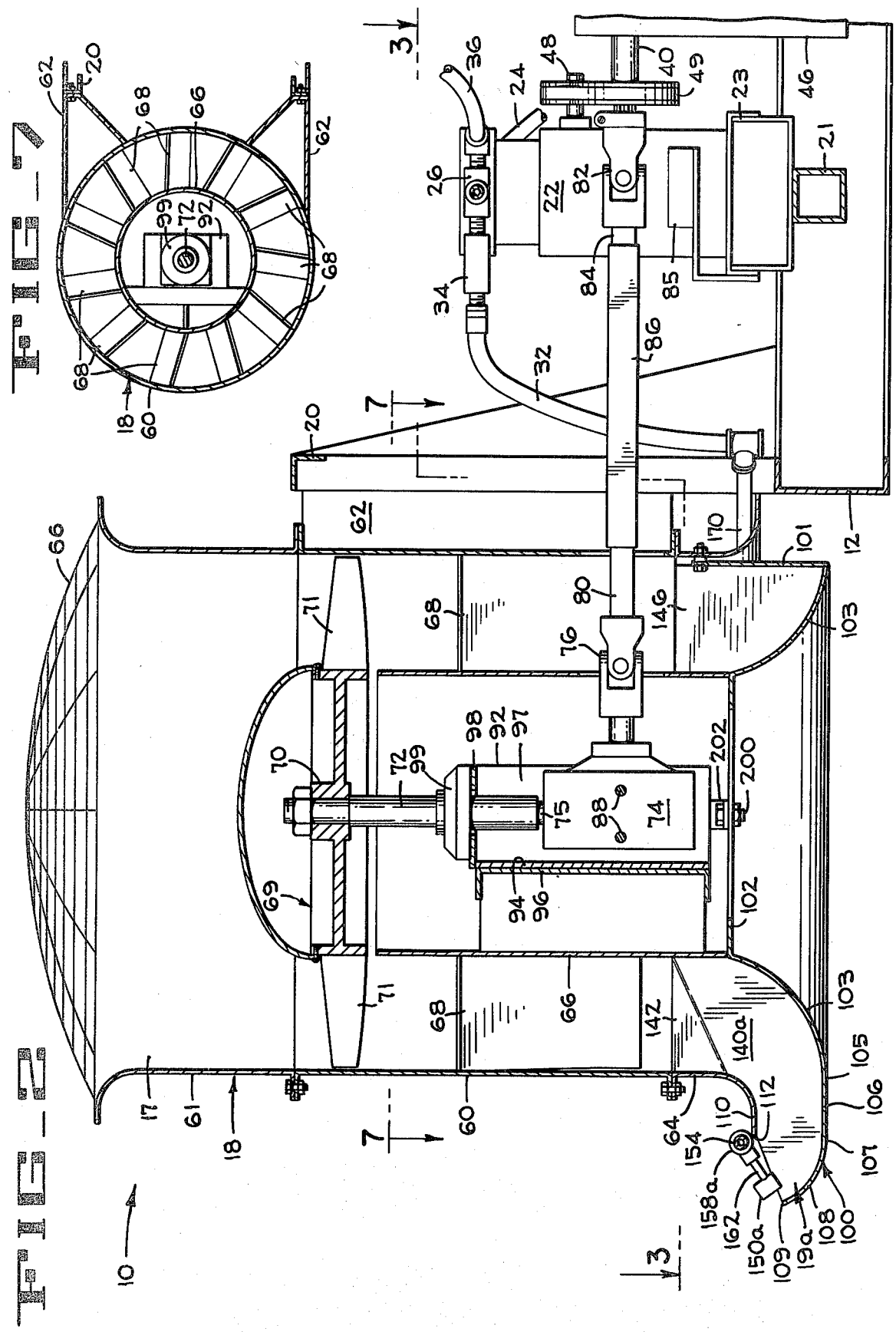

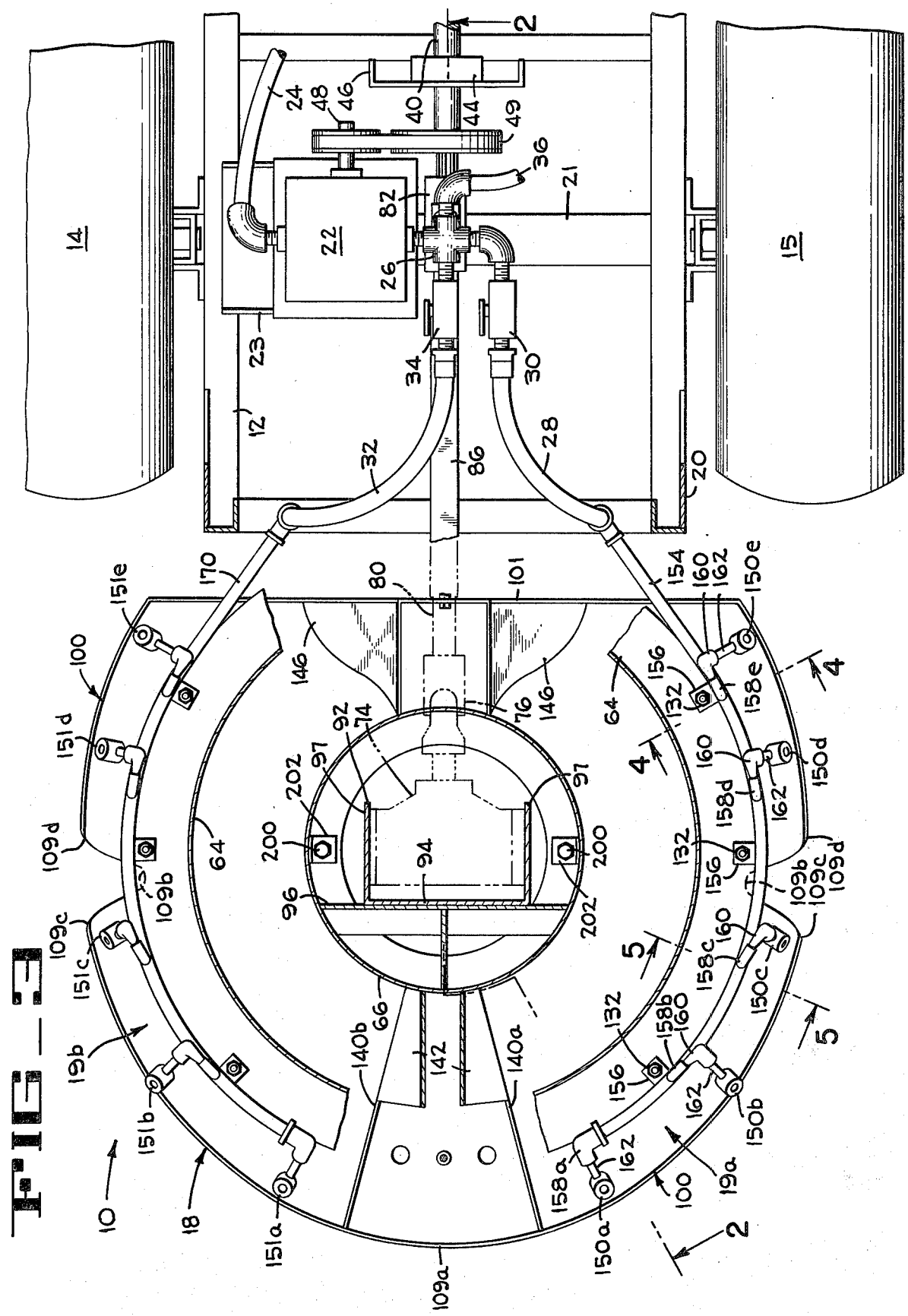

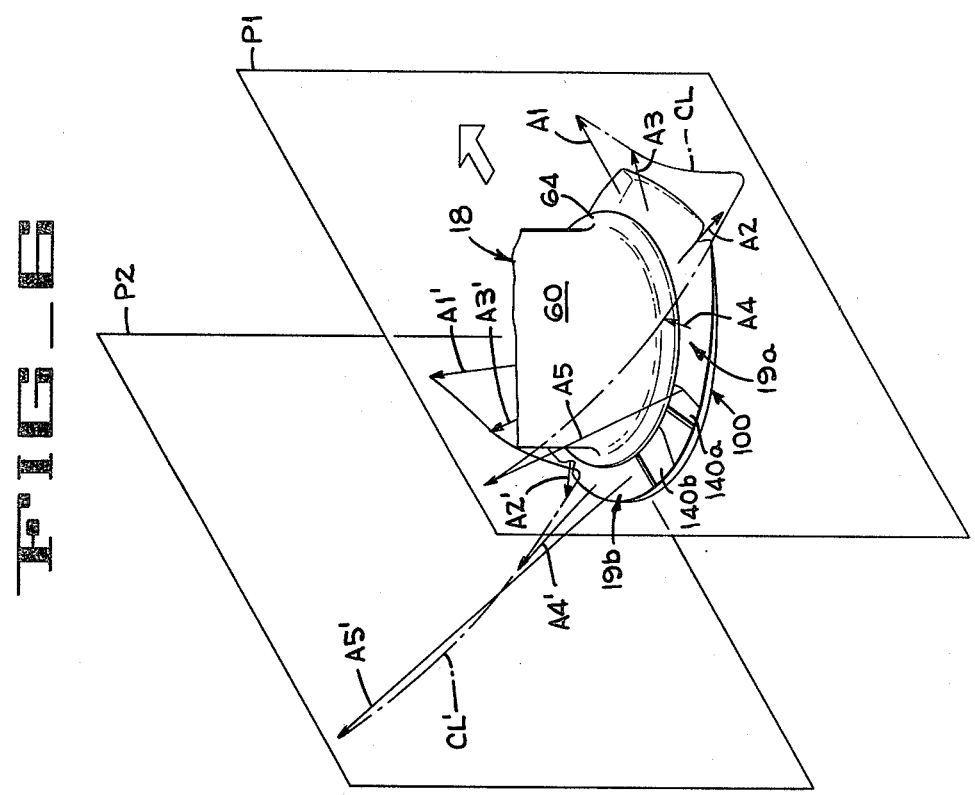
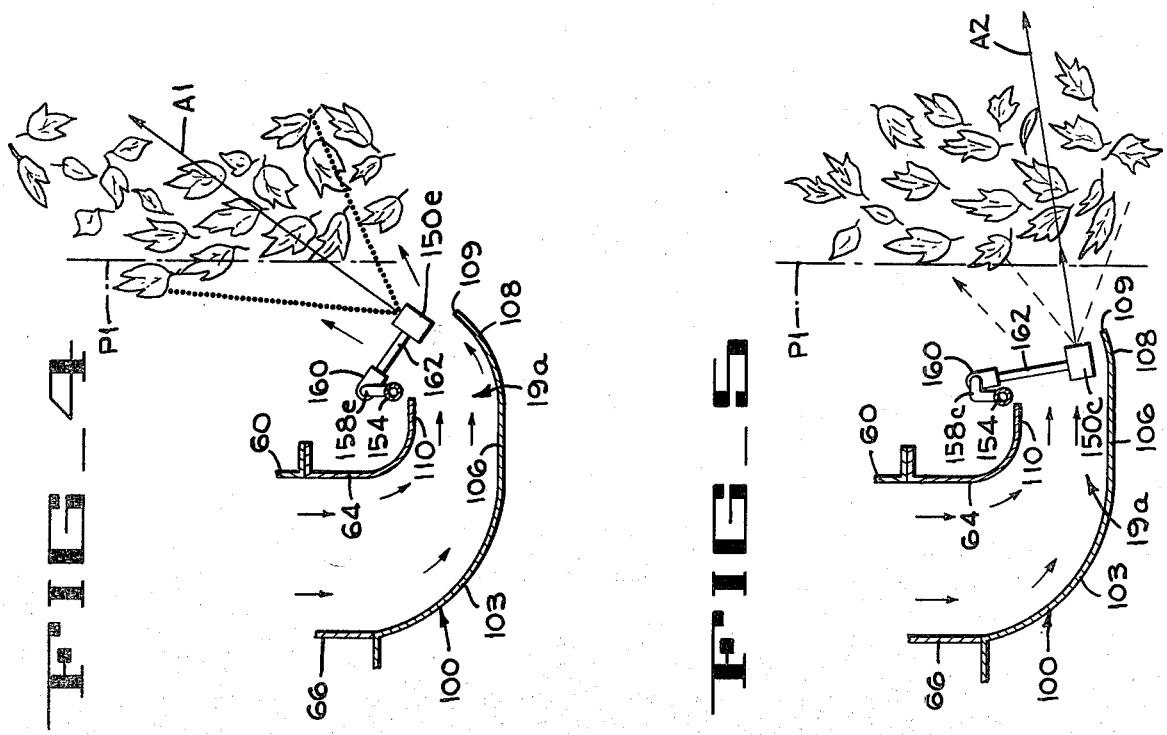

AIR SPRAYER APPARATUS FOR VINEYARDS AND THE LIKE

BACKGROUND OF THE INVENTION

1. Field of the Invention

The present invention relates to apparatus for spraying plants with agricultural solutions such as pesticides or fungicides, and more particularly, it concerns an air sprayer for row crops of low or medium height, such as trellissed grapevines and the like, which employs an air blast to deliver atomized spray solution throughout the foliage and fruits of the plants.

2. Description of the Prior Art

Air sprayers, or air blast sprayers, have been employed for many years to apply pesticides, fungicides and other agricultural liquid solutions to the foliage and fruits of orchards, groves and vineyards. An air sprayer generally employs a liquid flow system and an air flow system designed to work together to deliver a controlled air-spray pattern which penetrates the foliage and fruits of a plant. The liquid flow system of the sprayer includes a holding or spray tank mounted on a trailer frame, a plurality of spray nozzles, a pump which is driven by the power take-off of the tractor which pulls the spray trailer, and conduits and valving for delivering the spray solution from the tank to the pump and subsequently to the nozzles under regulated pressure. The air flow system employs a blower assembly having at least one discharge opening for directing an air blast generally transversely of the path of travel of the sprayer. The spray nozzles are disposed in the discharge opening to deliver atomized spray solution for entrainment in the air blast.

One known type of air sprayer for spraying vineyards includes a centrifugal or squirrel cage fan which is disposed behind the spray tank on the sprayer trailer. The centrifugal fan includes a housing having air inlet openings oriented transversely of the path of travel of the sprayer, and an outlet opening extending rearwardly and longitudinally of the sprayer's path of travel. Normally, a pair of deflector housings are connected to each outlet opening. Each deflector housing has a "fish tail" shape and has an arcuate discharge opening which extends transversely of the sprayer. The arcuate opening is vertically oriented and is adapted to deliver an air blast extending over a vertical, widely diverging pattern. Typically, the deflector housings are adjustably mounted to the respective centrifugal fans so that the air blasts may be directed at various angles relative to the horizontal. This type of sprayer is normally used to spray two rows of vines at one time, the deflector housings being adjusted to direct the air blasts in opposite transverse directions relative to the path of movement of the sprayer. A major problem associated with this type of sprayer is that the high velocity air blast from each deflector housing discharge opening tends to cause the broad leaves of grapevines to "shingle", that is, to lie flat against each other so as to prevent the spray solution from penetrating through the leaves.

It is also known that the centrifugal type of fan sprayer may be employed to provide two air blasts against a single row of grapevines. This is accomplished by mounting two deflector housings in series to each centrifugal fan and by positioning the deflector housings at different rotative positions so as to extend at different angles toward one side of the sprayer trailer. It should be noted that due to the widely diverging, vertical spread of each of the two air blasts emanating from the separate openings, it is not possible to adjust the deflector housings at substantially different angles, because to do so would mean that a substantial portion of at least one of the air blasts would be directed either toward the ground or above the plants to be sprayed. Thus, the air blasts from the separate deflectors impinge upon the foliage at essentially the same angle. The aforementioned "shingling" problem is not obviated by such separate air blasts.

Another known type of vineyard air sprayer includes an axial fan type of blower assembly which is horizontally mounted behind the spray tank on a sprayer trailer. An example of such a sprayer is the Model LV300 Air Sprayer manufactured and sold by the FMC Corporation, which corporation is the assignee of the present application. The axial fan type of sprayer delivers a spray solution with a relatively low velocity, high volume air blast, in comparison to the aforementioned centrifugal fan-type sprayer which delivers a spray solution with a relatively high velocity, low volume air blast. It should be noted that the axial fan type of sprayer is similar to the centrifugal fan type sprayer inasmuch as its air discharge openings are also arcuate in form and are oriented in a vertical plane to deliver a widely diverging air blast in a transverse direction relative to the path of movement of the sprayer.

In particular, the axial fan type of blower includes a cylindrical outer shell having an annular discharge ring at the front end thereof and a frustoconical diffuser mounted coaxially within the discharge ring in a spaced, parallel relationship therewith. The diffuser is truncated at its bottom end by a horizontal wall, and a pair of partitions are radially arranged between the diffuser and the discharge ring adjacent the top ends thereof. Thus, two arcuate discharge openings are formed at each side of the blower assembly between the diffuser and the discharge ring and between the bottom wall and the respective radially extending partitions. Such discharge openings are substantially similar to that of the aforedescribed centrifugal fan type of sprayer, but are much larger and deliver a greater volume of air. As in all air blast sprayers, including both the centrifugal and axial fan type, spray nozzles are positioned in the air discharge openings to deliver atomized spray solution to the air blast emanating therefrom. It has been found that the axial fan type of a sprayer also produces the "shingling" effect which reduces the penetration of the spray solution into the foliage and fruits of the plants being sprayed.

In both the centrifugal fan and the axial fan type of sprayers, the inlet openings of the blower assemblies are horizontally disposed and are relatively close to the ground. Thus, debris, dirt or other matter which is stirred up by the wheels of the trailer and tractor as the sprayer is drawn through the field can be drawn into the inlet opening. Such matter, when discharged in the air blast, tends to "sandblast" the foliage and fruits. To obviate this problem, the axial fan type of blower is sometimes provided with an air deflector positioned below the bottom end of the air inlet opening so as to divert debris and other matter from being directly drawn into such openings.

SUMMARY OF THE INVENTION

The present invention provides an air sprayer which is adapted to spray low-lying and medium height row crops without taking in dirt and other small debris which has been blown into the air by the air blast or air blasts directed at the crops. The sprayer includes a vehicle and a blower assembly mounted to the vehicle that is comprised of a housing having an air inlet opening and an air outlet opening with the air outlet opening being located at the lowermost end of the housing. Fan means are mounted within the housing to create an air draft therethrough. The blower assembly further includes a deflector assembly which is mounted at the air outlet opening of the blower housing to create an air discharge opening extending in a generally horizontal plane and which receives air generated by the fan means to generate an air blast generally transversely of the direction of movement of the sprayer apparatus. Spray nozzles are provided in the discharge opening of the deflector assembly, and liquid pesticides or other spray solutions are fed under pressure to the nozzles from a holding tank mounted upon the vehicle. The blower housing is mounted on the sprayer vehicle so as to extend over a substantial distance in the vertical direction with the air inlet opening being at the top thereof to thereby draw air into the housing from a relatively elevated position. The orientation and spacing of the air inlet opening above the ground minimizes the possibility that dirt and other small debris, which may be suspended in the air overlying the ground surface surrounding the sprayer, will be sucked into the blower assembly and subsequently blown onto the crops being sprayed.

In a preferred embodiment of the invention the deflector assembly includes an upwardly projecting arcuate lip section which terminates in an outer edge that is cut along a path which is oblique to the horizontal, whereby the air directed thereover is distributed upwardly at varying angles relative to the horizontal thereby impinging on upper portions of the plants with differing vertical angles of impingement. As the sprayer is moved past the plants to be sprayed, the vertically distributed air blast tends to separate the leaves of the plants rather then tending to force the leaves together. Thus, the sprayer having the preferred deflector assembly eliminates the aforementioned shingling problem and assures that the spray solution carried in the air blast completely covers the leaves and fruits of the plants to be sprayed.

Further according to a preferred embodiment of the present invention, the arcuate lip section of the deflector assembly has a notch formed in its outer edge which is designed to distribute the air flowing thereover below a horizontal plane through such lip section. Such horizontally and downwardly distributed air flow is effective in carrying the spray solution against the base portions of medium height plants, such as grape vines, or against low lying plants, such as strawberries or tobacco. This has been found to be very effective in spraying grape vines inasmuch as the vines are sprayed from top to bottom with an air blast that impinges upon the plants with varying vertical and horizontal angles of impingement.

BRIEF DESCRIPTION OF THE DRAWINGS

FIG. 1 is a side elevation illustrating the air sprayer apparatus of the present invention.

FIG. 2 is an enlarged vertical section illustrating the blower assembly of the spray apparatus, said section being taken generally along line 2—2 of FIG. 3.

FIG. 3 is an enlarged section taken generally along line 3—3 of FIG. 2, with portions of the discharge ring being broken away.

FIG. 4 is a diagrammatic section taken along line 4—4 of FIG. 3 and showing the air flow pattern in an upwardly deflecting portion of the apparatus.

FIG. 5 is a diagrammatic section taken along line 5—5 of FIG. 3 and showing the air flow pattern in a generally horizontally deflecting portion of the apparatus.

FIG. 6 is a reduced, diagrammatic, isometric view of a portion of the deflector assembly which illustrates the varying angles of distribution above the horizontal of the airflows generated from the two discharge openings of the sprayer apparatus, with the sprayer apparatus being stationarily located equidistantly between the rows of crops to be sprayed and with such rows being indicated by two vertical planes.

FIG. 7 is a reduced section taken along line 7—7 of FIG. 2.

DESCRIPTION OF THE PREFERRED EMBODIMENT

Referring now more particularly to FIGS. 1-3, an air sprayer apparatus 10 for vineyards and the like there shown will be seen to be of the axial fan type and to include a main frame 12 which is movable on a pair of wheels 14 and 15 (FIG. 3). A holding tank 16 for an agricultural spray solution, such as a pesticide or fungicide solution, is mounted to the front end of the frame 12. An axial fan type of blower assembly 18 is vertically mounted at the rear end of the frame to an upright support frame 20 which is attached to the rear end of the main frame (FIGS. 2 and 3). As will be hereinafter described, the blower assembly 18 has an air inlet opening 17 formed at its upper end so as to take in air at a location which is substantially above the ground level. The blower assembly includes a deflector housing at its lower end comprising an air discharge ring 64 and a truncated, annular diffuser member 100 disposed in a spaced, coaxial relationship with the ring 64. By means of a vertical wall 101 forming the front end of the diffuser member 100 and partitions 140a and 140b (FIG. 3) at the rear end thereof, as will be hereinafter described, two air discharge openings 19a and 19b (FIG. 6) are formed between the diffuser and discharge ring. A first air blast extending to the right of the vehicle is generated from the discharge opening 19a, and a second air blast is discharged through the opening 19b to the left side of the vehicle. A first set of spray nozzles 150a-150e (FIG. 3) is provided in the opening 19a, and a second set of spray nozzles 151a-151e (FIG. 3) is positioned in the other discharge opening 19b. As the sprayer 10 is towed between adjacent rows of vines, such vines are sprayed by the separate air blasts having the spray distributed therein by the respective sets of spray nozzles. As will be described hereinafter in detail, the sprayer apparatus 10 is adapted to generate air blast patterns which are sloped in the vertical planes of the two rows of foliage being sprayed so that as the sprayer apparatus is pulled between such rows, the air blasts will impinge upon the foliage with varying vertical velocity components. In this manner, the broad leaves of the grape vines are separated by the air blasts, thus assuring that the atomized spray solution will fully penetrate the foliage and fruits of the two rows of vines.

It should be noted at this point that a great number of the elements of the vineyard air sprayer 10 are of conventional construction. Specifically, the holding tank 16, the pump 22 including the associated conduits and valving, and many of the elements of the blower assembly 18 are the same as those used in the aforementioned commercially available FMC Model LV300 Air Sprayer.

Spray solution is pumped from the holding tank 16 to the blower assembly 18 by pump 22 which is mounted on a support bracket 23 (FIG. 3) attached to a cross member 21 which is mounted to the main frame 12 in a position located between the holding tank and the blower assembly. Spray solution is supplied to the pump by a conduit 24 (FIG. 3), and the output of the pump is delivered to a four-way connector 26. One port of the connector 26 communicates with a first delivery hose 28 via a first shut-off valve 30. Another outlet port of the connector communicates with a second delivery hose 32 via a second shut-off valve 34. A third outlet port of the connector is connected to a hose 36 which extends through the holding tank and leads to a pressure gauge and relief valve assembly 37 (FIG. 1) mounted at the front end of the holding tank in a position which is visible to the operator of the tractor (not shown).

The power for driving the pump 22 is supplied in a conventional manner by a shaft 40, which extends through the holding tank 16. The front end of the shaft 40 is coupled to a short shaft 42 (FIG. 1), which, in turn, is arranged to be connected to the power take-off of the non-illustrated tractor. The shaft 40 is supported at its rear end by a bearing 44 supported by a bracket 46 mounted to the main frame 12 (FIG. 3). The shaft 40 is supported at its front end by a similar bearing and bracket (not shown). The input shaft 48 of the pump has a pulley mounted thereon which receives a belt 49 entrained on a pulley affixed to the shaft 40.

As shown in FIG. 3, the delivery hose 28 is connected to one end of a tubular manifold 154. The manifold 154 is arcuately shaped and is mounted immediately above the discharge opening 19a of the blower assembly 18 (FIGS. 1 and 3). As seen in FIG. 3, the manifold 154 has three brackets 156 extending therefrom, and the brackets are affixed to the discharge ring 64 by bolts which extend upwardly through the discharge ring and nuts 132 which are secured thereto. The manifold 154 has an elbow fitting 158a at the rear end thereof and four elbow fittings 158b–158c extending outwardly from the manifold at various positions therealong. Each of the four elbow fittings 158b–158e has a further elbow fitting 160 received in the outer end thereof, and the fitting 158a and the fittings 160 each has a short tube 162 received therein. The nozzle 150a is mounted on the tube 162 extending from the elbow 158a. The nozzles 150b–150e are mounted to the ends of the tubes 162, extending from the elbows 158b–158e, respectively. The elbows 158a, 160 and the various nozzles are adjusted such the spray nozzles direct their respective patterns generally radially of the blower assembly. The inclination of each of the nozzles relative to the horizontal is set according to the inclination of the airflow above horizontal in the vicinity of each of the nozzles, which airflow, as will be hereinafter described, varies widely from nozzle position to nozzle position.

As shown in FIG. 3, a second manifold 170 is connected to the delivery hose 32, and the spray nozzles 151a–151e are mounted to the manifold 170 within the air discharge opening 19b on the left side of the blower assembly in the same manner as the nozzles 150a–150e are mounted on the right side of the blower assembly. The left and right side manifolds 170 and 154 and the spray nozzle assemblies connected thereto are symmetrical about a longitudinal vertical plane through the axis of the blower assembly 18, as seen in FIG. 3.

The spray nozzles 150a–150e, 151a–151e are of conventional construction and are the same as those used in the aforementioned commercially available axial fan type of sprayers. They each include a disc and produce a conical pattern of fine, atomized spray, which spray is entrained in the airflows distributed from the respective discharge openings. It will be appreciated from the foregoing comments that the airflows, or air blasts, emanating from each discharge opening serve both to deliver the spray solution to the leaves and fruits of the grape vines and also to separate the leaves so as to provide complete penetration of the spray solution into the inner reaches of the grape vines.

The blower assembly 18, as best shown in FIG. 2, includes a cylindrical main shell 60 having an inlet ring 61 bolted to a flange at the upper end of the main shell. The air inlet opening 17 is formed within the bore of the inlet ring 61. A conventional ribbed guard 66 is secured over the upper end of the inlet ring. The cylindrical main shell 60 is vertically mounted to the support frame 20 above the main frame 12 by a pair of brackets 62. As shown in FIG. 7, the brackets 62 are generally V-shaped and are welded to the main shell so as to extend vertically at the sides of the apparatus. The brackets, and thus the blower assembly 18, are detachably secured to the support frame 20 by bolts as shown. This vertical mounting of the main shell 60 of the blower assembly having its inlet opening facing upwardly and being spaced at a substantial distance above the ground assures that the air drawn into such inlet opening will be substantially free of dirt, sand or other debris to thereby assure that the airflows issuing from the discharge openings will not contain matter which will be injurious to the grave vines being sprayed.

As illustrated in FIG. 2, a cylindrical inner shell 66 is concentrically mounted within the main shell 60 so as to extend downwardly from the lower end of the main shell. The inner shell 66 is mounted to the outer main shell 60 in a conventional manner by a plurality of contoured straightening vanes 68 (FIGS. 2 and 7). Each of the vanes has a conventional curvilinear contour. The outer edges of the vanes are welded to the inner surface of the main shell, and the inner edges of the vanes are welded to the outer surface of the inner shell. A longitudinally extending annular passageway is thus formed between the inner shell and the main shell. Air is forced through such passageway by an impeller 69 which is coaxially mounted above the inner shell within the upper end of the main shell. The straightening vanes serve to smooth out turbulent airflow from the impeller such that the airflow from the opening at the bottom of the annular passageway between inner and main shells will be radially deflected by the diffuser member 100, as will be hereinafter described.

As shown in FIG. 2, the impeller 69 is of a conventional form including a hub portion 70 and a number of contoured blades 71 which extend radially from the hub portion. The impeller is mounted on the end of a drive shaft 72. The drive shaft 72 extends axially within the inner shell 66 and is keyed to the output shaft 75 of a gear box 74. The input shaft of the gear box extends at right angles to the output shaft 75 and forwardly in the apparatus as shown. This input shaft is connected by a universal joint 76 to a further shaft 80 which has a square cross-section. The rearward end of the drive shaft 40 has a universal joint coupling 82 detachably mounted thereto, and a short shaft 84, which has the same cross-section as that of the shaft 80, extends rearwardly from the coupling 82. A square sleeve member 86 is affixed about the shaft 84 and is slidably received on the shaft 80 so as to detachably connect the shaft 80 to the drive shaft 40. A holder 85 is provided for receiving the free end of the coupling 82 when the shaft 80 of the blower assembly is disengaged.

It should be noted at this point that the detachable connection of the drive shaft 40 and the shaft 80 of the blower assembly 18 is provided so that the sprayer apparatus 10 may be utilized for hand-held spraying. To set the apparatus up for hand-held spraying, the coupling 82 is disconnected from the drive shaft 40 to allow the sleeve 86 to be rearwardly slid upon the square shaft 80. The free coupling 82 is then engaged on a stub pin (not shown) of the underlying holder 85. One of the hoses 28 or 32 is then disconnected from its associated shut-off valve 32 or 34, and a hand-held spray unit (not illustrated) is connected to such shut-off valve. The other of the shut-off valves is then operated to interrupt the flow to the other of the hoses 28 or 30 and thus shut-off flow to its respective manifold 154 or 170. Then, when power is supplied by the power-take-off connection to drive the pump 22, the flow of pesticide solution is directed only to such hand-held spray unit, while the flow of the solution to the sprayer manifolds is blocked and the power for the blower impeller 69 is also disengaged.

Continuing the description of the blower assembly 18, it will be seen in FIGS. 2, 3 and 7 that the gear box 74 is mounted to the inner shell 66 by a box-like casing 92. The casing 92 is open at its front and lower ends (FIG. 2), and the rear wall 94 thereof is fastened to a support bracket 96 which is vertically attached to the inner surface of the inner shell 66. The gear box is mounted to the side walls 97 of the casing by bolts 88, which are indicated in cross-section in FIG. 2. The upper wall 98 (FIG. 2) of the casing has an aperture formed therethrough to receive the impeller drive shaft 72, with a bearing 99 for the drive shaft being mounted to the upper surface of such upper wall. It will be understood that when the impeller 69 is driven, air will be drawn through the inlet opening 17, forced to flow downwardly in the annular channel between the shells 60 and 66 and then outwardly from the exit opening thereof between the discharge ring 64 and the diffuser 100 where it is finally discharged through the discharge openings 19a, 19b at the opposite sides of the blower assembly.

The diffuser 100 is specially shaped to deflect the discharged air at various angles above the horizontal so as to provide airflow which impinges on the grape vines at different angles of impingement in the vertical plane. The diffuser is spaced from the discharge ring 64 by a plurality of spacer tubes 130 (FIG. 1) which are mounted vertically between the discharge ring and the diffuser in alignment with the bolts and nuts 132 (FIG. 3) which secure manifolds 154 and 170 to the discharge ring. The diffuser has the form of an annular channel which is truncated at one side by the wall 101 located in a plane which extends transversely of the apparatus (FIG. 3). A flat annular flange 102 is formed at the upper and radially inner side of the diffuser, with the circular outer edge, or corner, of the flange having a radius equal to the radius of the inner shell 66, as seen in FIG. 3. The flange 102 is connected by bolts 200 (FIGS. 2 and 3) to lugs 202 which extend inwardly from the lower end of inner shell 66. The diffuser is concentrically mounted to the inner shell so that the contiguous surface portions of the inner shell and the diffuser form a continuous contoured surface. The diffuser further includes a frustoconical wall portion 103 which curves downwardly and outwardly from the inner flange 102 along a circular arc to a diameter 105 (FIG. 2) which is approximately equal to the diameter of the outer main shell 60. The frustoconical wall portion 103 deflects the airstream exiting from the annular channel formed between the shells to arcuate paths which extend transversely and generally radially of such shells. The diffuser has a flat annular bottom wall portion 106 which extends horizontally and outwardly of the outer diameter 105 of the frustoconical portion 103 to an outer diameter 107 (FIG. 2) which is disposed below the outer edge 112 of the discharge ring 64. The discharge ring 64 (FIG. 2) has a cylindrical upper portion, an outwardly curved neck portion depending therefrom, and a flat annular wall portion 110 extending from the curved neck portion and terminating in the outer edge 112.

As shown in FIGS. 2 and 3, the flat wall portion 106 of the diffuser is truncated at its front end by the wall 101. The diffuser is mounted to the inner shell 66 such that the wall 101 extends vertically and transversely of the long axis of the main frame 12 at the front end of the blower assembly; with such mounting, the flat wall portions 110 and 106 of the ring 64 and diffuser 100, respectively, are parallel to each other. The airstream, which has been turned radially by the frustoconical wall portion 103 of the diffuser, converges between such flat parallel wall portions 110 and 106 of the discharge ring and the diffuser, respectively. It should be noted that if the diffuser were modified so that it terminated in an outer edge at the diameter 107 (FIG. 2), the discharged airstream would be directed horizontally and radially of the blower assembly. Such an alternative air distribution pattern may be desired for spraying low-lying field crops, such as strawberries or the like. It should be understood that if such a modification of the diffuser were to be made, the two sets of nozzles 150a–150e and 151a–151e would be oriented horizontally so as to direct their sprays parallel to the flow of air.

In the spraying of grape vineyards or the like, however, the air sprayer apparatus 10 must deliver an air blast which covers a vertical swath extending from near the base of the grape vines to the top portions thereof. To provide for such vertical spray distribution, the diffuser has a truncated, upwardly concave annular outer wall portion, or lip, 108 which extends outwardly and upwardly from the outer diameter 107 of the flat wall portion 106. The lip 108 has an annular contour in the form of a surface of revolution about the axis of the diffuser. The lip functions to upwardly deflect the airstream emerging radially and horizontally from between the flat, parallel wall portions 110, 106 of the discharge ring and diffuser.

In order to deflect the airflow at differing angles of inclination from each of the discharge openings 19*a*, 19*b*, the lip 108 of the diffuser 100 terminates in an edge 109 having a convolute helical shape (FIG. 1) at each of the discharge openings 19*a* and 19*b*. The edge 109 is symmetrical about a vertical plane extending longitudinally through the vertical axis of the diffuser. At each side of the diffuser the edge extends from a high point 109a at the rearward end thereof downwardly along a sloped contour to a low point 109b. As shown in FIG. 3, the edge is notched, or recessed, through the lip into the contiguous flat wall portion 106 of the diffuser such that the low point 109b is situated at the apex at such notch. The low point is positioned just to the rear (FIG. 3) of a vertical plane extending transversely through the vertical axis of the diffuser. The edge 109 of the diffuser slopes upwardly from such low point along an opposite slope to the juncture with the vertical front wall 101. In side elevation, FIG. 1, the rearward portion of the edge 109 in each discharge opening slopes along a downwardly and forwardly inclined plane between the high point 109a at the rear end of the diffuser and a point 109c; the forward portion of the edge slopes downwardly in a rearward direction from the junction with the wall 101 along a straight line (in side elevation) to a point 109d located forward of the low point 109b. The notch portion is formed in the lip between the points 190c and 109d. As shown in FIG. 3, the notch has a rounded V-shape in top plan view. It will be noted (from FIG. 1) that the inclination of the rearward portion of the edge 109 is steeper than that of the forward portion so that the portion of the airflow deflected therefrom varies over a greater range of angles above the horizontal and so that the air directed from the rear end of the discharge openings impinges on or above the top portions of the respective rows of grape vines.

In order to redirect air which would otherwise be deflected directly to the rear of the sprayer apparatus, vertical partitions 140a and 140b (FIGS. 2 and 3) are welded to the diffuser 100 at the trailing end thereof to divert the airstream at such location. The partitions 140a and 140b are radially arranged at angles of approximately 15° from the longitudinally extending plane of symmetry of the blower assembly. The partitions have curved lower and upper edges (FIG. 2) contoured to fill the space between the discharge ring 64 and the diffuser 100. Each of the partitions has an inwardly beveled portion 142 at its upper end, and such beveled portions 142 are joined at a peak which extends longitudinally within the longitudinal plane of symmetry of the blower assembly. Such partitions thus define the rear wall of the air discharge openings. The front walls of the discharge openings are formed by the vertical wall 101 of the diffuser member. It will be seen in FIG. 3 that a pair of outwardly curved deflector walls 146 are disposed at the front end of the diffuser member between the front wall 101 and the frustoconical wall portion 103. Such deflector walls serve to direct air in the forward portions of the annular passageway between the inner and outer shells 66, 60 outwardly along the vertical front wall of the diffuser. It will be understood that the portion of the airflow emanating from each discharge opening adjacent the front wall 101 will, in part, stem from the air diverted by the curved deflector walls 146 and will, in part, stem from air impinging on the frustoconical wall portion 103 of the diffuser member at locations radially inwardly spaced from the outer edge of the vertical wall 101. Thus, such airflow from the front end of each discharge opening will have a strong nonradial transversely extending component and a weaker radially extending component. With the exception of such transverse airflow, the remainder of the airflow through each discharge opening emanates generally radially from the arcuate opening formed between the diffuser and the discharge ring.

Having thus described the construction of the vineyard air sprayer 10, a brief description of the distribution pattern of the airflow from each of the discharge openings 19a, 19b will now be set forth in connection with FIGS. 4–6 of the drawings. FIG. 4 is a cross-sectional view taken on a vertical plane which extends radially through the axis of the blower assembly at an angular position which is aligned close to the nozzle 150e, which nozzle is closest to the vertical wall 101 defining the front end of the air discharge opening 19a. It will be seen that the air flowing through the annular passageway between the inner shell 66 and the cylindrical upper end of the discharge ring 64 is turned outwardly by the frustoconical portion 103 of the diffuser 100. The airflow is deflected radially outwardly by the wall portion 103 between the parallel, flat wall portions 110 and 106 of the discharge ring and diffuser, respectively. The bulk of the airflow at this point is in a lower portion of the arcuate opening between such parallel wall portions due to a crowding effect against the frustoconical portion 103 of the diffuser. Such outwardly flowing air then impinges upon the upwardly curving lip 108 of the diffuser and is turned upwardly thereby with the extent of such turning being determined by the degree to which such lip extends above the horizontal bottom wall portion 106. In the vicinity of the spray nozzle 150e the edge 109 of lip 108 extends relatively far above the horizontal bottom wall 106 of the diffuser and therefore turns the air at a relatively great angle above the horizontal. As depicted by the long arrow A1 in FIG. 4, the air is directed generally at an angle of about 55° above the horizontal. It will be seen that the spray nozzle 150e is mounted to the manifold 154 such that the conical spray pattern ejected from the nozzle, as indicated by the dotted lines in FIG. 4, is centered about an axis which is parallel to the main flow of air around the nozzle, as indicated by the arrow A1. It will also be noted that the airflow from such portion of the discharge opening, as indicated by the shorter arrows in the drawings, is comprised of diverging airstreams; however, such airflow diverges over a relatively narrow angle in contrast to the widely diverging patterns produced by the prior art vertically oriented air discharge openings.

FIG. 5 depicts the flow of air through the discharge opening 19a in the vicinity of the nozzle 150c, which is located in the opening just to the rear of the notched portion of the lip 108. Due to the downward sloping of the edge 109 of the lip, the portion of the edge in the vicinity of the nozzle 150c will be substantially lower than the edge in the vicinity of the nozzle 150e. Thus, the lip at nozzle 150c presents relatively little contact area to the airflow emanating from between the parallel wall portions of the discharge ring and the diffuser, and, accordingly, such airflow will be turned upwardly above the horizontal to a relatively small degree. Specifically, in the vicinity of the nozzle 150c, the lip turns the airflow upwardly at an angle of about 10° above the horizontal, such inclination of the airflow being indicated by the long arrow A2 in FIG. 5. Again it will be noted that the nozzle 150c is oriented parallel to the airflow. In order to direct the spray pattern of the solution from the nozzle 150c rearwardly of the notched portion of the diffuser, the nozzle does not extend radially relative to the diffuser but is angularly displaced toward the rear of the diffuser (see FIG. 3). Such rearward displacement of the nozzle 150c is preferred due to the relatively close proximity of the nozzle 150d and also due to the relatively more intense flow of air through the notched portion of the diffuser.

FIG. 6 is an isometric, diagrammatic representation of the convolute, sloped air distribution pattern from each of the discharge openings 19a, 19b of the blower assembly 18. The airflow from the discharge opening 19a is depicted by the arrows A1-A5, the arrows A1 and A2 being the same as those represented in FIGS. 4 and 5, respectively. The airflow from the oppositely disposed discharge opening 19b is depicted in FIG. 6 by the arrows A1'-A5'. In FIG. 6 the planes P1 and P2 represent vertical planes through the adjacent rows of grape vines to be sprayed, that is, the rows of vines between which the air sprayer apparatus 10 is pulled. The large arrow in FIG. 6 indicates the direction of movement of the air sprayer apparatus between such rows. The plane P1 of the right hand row of vines is depicted in FIGS. 4 and 5 by the vertical line P1 in each of such figures. It will be seen from FIG. 6 that the airflow emanating from each discharge opening impinges upon the plane of the foliage in a convolute sloped pattern indicated by curved lines CL and CL'.

The arrows A1 and A1' represent the flow of air from the discharge openings 19a and 19b, respectively, in the vicinity of the nozzles 150e and 151e, respectively. It will be seen that such flow extends at a relatively large angle above the horizontal; however, due to the relatively close proximity of the planes of the grape vines P1 and P2 from such nozzles, the flow of air impinges upon the planes of the foliage at an intermediate height relative to the height of impingement of the flow from the rearward end of the diffuser, as indicated by the arrows A5 and A5'. The flow of air around the nozzles 150d and 150d from the respective discharge openings is at a very small angle above the horizontal. The flow of air immediately forward of the nozzles 150d, 151d dips downwardly to a level below the horizontal bottom wall 106 of the diffuser. Such downwardly directed portions of the airflow are formed by the notched portions in the lip 108 which extend into the flat annular portion 106 of the diffuser. It will be recognized that such notched portions enable the sprayer to generate airflow patterns which impinge upon the base portions of the rows of grape vines.

The air distribution pattern from the rearward portion of each side of the blower assembly extends upwardly along a slope so as to cover a vertical swath with the airflow being directed at increasing angles of inclination above the horizontal. The arrows A2, A2' represent the flow of air from the respective discharge openings in the vicinity of the nozzles 150c, 151c which (as previously indicated with reference to FIG. 5) is at an angle of about 10° above the horizontal. The airflow from the discharge openings in the vicinity of the most rearwardly positioned nozzles 150a and 151a, as indicated by the arrows A5 and A5', extends at an angle of approximately 58° above the horizontal. Due to the arcuate shape of the discharge opening and due to the steepness of such airflow, the airflow from the rearward portion of each discharge opening impinges upon the upper extents of the rows of plants to be sprayed. The airflow around the nozzles 150b and 151b is deflected at an angle above the horizontal which is intermediate that of the angle of the airflow in the vicinity of the nozzles 150a, 151a and the nozzles 150c, 151c; such flow around the nozzles 150b and 151b is indicated by the arrows A4 and A4' in FIG. 6. Thus, it will be seen that the portion of airflow generated from the middle of each discharge opening will impinge upon the leaves with a relatively small vertical velocity component as compared to that of the portion of the airflow emanating from the rear end of each discharge opening. As the sprayer 10 is pulled between the rows of grape vines, the grape vines will first be impacted by air flowing from the front portions of the discharge openings, as indicated by the arrows A1 and A1'. Thereafter, these same grape vines will be impacted with airflow which has first a decreasing and then an increasing vertical velocity component as the sprayer is pulled thereby. Such increase in the vertical velocity component of the airflow varies in accordance with the slope of the rearward portion of the edge 109 of the diffuser member. Such increasingly vertically directed airflow tends to separate leaves of the foliage to assure that the entrained spray solution is delivered to all parts of the plants being sprayed.

Although the best mode contemplated for carrying out the present invention has been herein shown and described, it will be apparent that modification and variation may be made without departing from which is regarded to be the subject matter of the invention.

What is claimed is:

1. An air sprayer apparatus for spraying plants with a liquid comprising: frame means movable along a path of travel, blower means mounted to said frame means for generating an air blast generally transversely of said path of travel of the frame means and at a height so as to impinge upon the plants to be sprayed as said frame means is moved by the plants, said blower means including a housing having an air inlet opening and an air outlet opening, impeller means within said housing, said impeller means drawing air into said inlet opening and forcing a stream of air outwardly through said outlet opening, deflector means for receiving said airstream from said outlet opening of said housing and for deflecting said airstream through an air discharge opening extending in a generally horizontal plane and into a projected pattern which is generally transverse to the path of travel of said frame means and at varying angles of inclination relative to the horizontal so as to impinge upon the plants with varying angles of impingement, said deflector means including a deflector wall having an inner end, an inner wall portion extending from said inner end, and an outer wall portion extending from said inner wall portion and terminating in an outer edge, said inner wall portion having a configuration adapted to direct the airstream discharged from said outlet opening generally transversely of the path of travel of said frame means, and said outer wall portion having an upwardly curved contour adapted to generally upwardly deflect the airstream flowing past said inner wall portion, said outer edge of said deflector wall being obliquely inclined relative to the horizontal so that the air blast is discharged from said discharge opening at varying angles relative to the horizontal, and spray nozzle means positioned in said discharge opening for spraying the liquid to be delivered to the plants into said air blast emanating from said discharge opening.

2. The apparatus according to claim 1 wherein said deflector means further includes an upper wall having a flat, annular wall portion which terminates in a curved outer edge which with the outer edge of the deflector wall defines said discharge opening.

3. The apparatus according to claim 1 wherein said deflector means includes an upper wall having a flat annular portion which terminates in a curved outer edge that defines the upper edge of said discharge opening, said inclined outer edge of the deflector wall having a convolute helical contour including a first helical portion which is downwardly sloped in a forward direction relative to said path of travel of the frame means, and a second helical portion disposed forwardly of said first helical portion which is upwardly sloped in said forward direction.

4. The apparatus according to claim 3 wherein said outer wall portion of said deflector wall has a recess formed therein whereby the portion of the air blast generated over said recess is directed at an angle relative to the horizontal which is substantially less than that of the rest of the air blast.

5. The apparatus according to claim 1 wherein said obliquely inclined edge of said deflector means has a recess cut therein whereby the air flowing over said recess in the edge emanates from said discharge opening at a substantially flat angle relative to the horizontal in comparison to the portions of the air blast emanating from the other portions of the discharge opening.

6. The apparatus according to claim 1 wherein said housing includes a cylindrical outer shell vertically mounted to said frame means, a cylindrical inner shell coaxially mounted within said outer shell, said air inlet opening being defined by the upper end of said outer shell, and said outlet opening of said housing being annular in form and defined at its outside by the lower end of said outer shell and at its inside by the lower end of said inner shell, said deflector means including a discharge ring mounted to the lower end of said outer shell, and said deflector wall having an annular form and being coaxially mounted adjacent the lower end of said inner shell in a spaced relationship relative to said discharge ring.

7. The apparatus according to claim 6 wherein said deflector wall is truncated at its front end relative to the path of travel of said frame means by a vertical, transversely extending wall which defines the forward end of said discharge opening, and further comprising a partition disposed rearwardly of said vertical wall which extends between said deflector wall and said discharge ring to define the rearward end of said discharge opening.

8. The apparatus according to claim 1 wherein said deflector means are provided on each side of said blower means for generating a pair of said air blasts in opposite transverse directions from the apparatus.

9. The apparatus according to claim 1 wherein said spray nozzle means comprises a plurality of spray nozzles spaced along said discharge opening with each of said nozzles being oriented generally in the direction of the air blast emanating from said discharge opening adjacent thereto.

10. An air sprayer apparatus for spraying plants with a liquid including frame means movable along a path of travel, blower means mounted to said frame means for generating an air blast which extends generally transversely of the frame means so as to impinge upon the foliage and fruits of plants situated transversely the path of travel of said frame means, and spray nozzle means for delivering atomized liquid into said air blast for entrainment therein and consequent delivery by said air blast to the leaves and fruits of the plants, said blower means including a housing mounted to said frame means to extend in the vertical direction and having an air inlet opening at the upper end thereof and an outlet opening at the lower end thereof, fan means disposed within said housing for drawing air into the inlet opening and directing a stream of air downwardly to said outlet opening, deflector means mounted to the lower end of said housing for deflecting the air discharging from said outlet opening outwardly of said housing through a discharge opening formed thereby to create said air blast, said discharge opening extending in a generally horizontal plane.

11. The apparatus according to claim 10 wherein said deflecting means includes a deflector wall having an upwardly curved outer wall portion which terminates in an outer edge, and a portion of said outer edge extending along a path which is obliquely sloped relative to the horizontal so as to distribute portions of the air blast at varying angles above the horizontal.

12. The apparatus according to claim 11 wherein said spray nozzle means comprises a plurality of spray nozzles spaced along said discharge opening with each of said nozzles being oriented generally in the direction of the air blast emanating from said discharge opening adjacent thereto.

13. The apparatus according to claim 10 wherein said deflecting means is provided on each side of said blower means for generating a pair of said air blasts in opposite transverse directions from the apparatus.

14. An apparatus for spraying a liquid against plants which are grown in rows comprising: vehicle means which is movable along a path parallel to the row of plants to be sprayed; blower means mounted to said vehicle means for generating at least one air blast in a generally transverse direction and at a height adapted to impinge upon the foliage of the plants to be sprayed; sprayer means mounted to said vehicle means for spraying a liquid into the air blast generated from said blower means; said blower means including housing means having an air inlet opening formed at one end thereof and an air outlet opening formed at the opposing end thereof; said blower means further including deflector means mounted to said housing means in communication with said air outlet opening, said deflector means having an air discharge opening oriented to direct an air blast in said generally transverse direction, said discharge opening being elongated and extending in a generally horizontal plane; said sprayer means including a plurality of spaced nozzles mounted within said air discharge opening; said blower housing means being mounted to said vehicle means such that said air inlet opening is disposed at the top end of said housing means and said outlet opening is disposed at the bottom end of said housing means thereby minimizing the possibility that dirt and other loose debris adjacent the ground will be drawn into said blower means and subsequently down onto the plants being sprayed.

15. An apparatus for spraying a liquid on low-lying or medium height plants which are grown in rows comprising: vehicle means which is movable along a path parallel to the row of plants to be sprayed; blower means mounted to said vehicle means for generating at least one air blast in a generally transverse direction and at a height adapted to impinge upon the plants to be sprayed; sprayer means mounted to said vehicle means for spraying a liquid into the air blast generated from said blower means, said blower means including housing means having an air inlet opening and an air outlet opening formed therein; said blower means further including deflector means mounted to said housing means in communication with said air outlet opening, said deflector means having an air discharge opening oriented to direct an air blast in said generally transverse direction, said air discharge opening being elongated and extending in a generally horizontal plane; said sprayer means including a plurality of nozzles mounted in spaced positions along said air discharge opening; said deflector means being so contoured and so mounted relative to said vehicle means as to direct at least a portion of the air blast emanating therefrom in a generally horizontal direction adjacent the ground to thereby impinge upon portions of the plants which are adjacent the ground and to direct other portions of the air blast at various upwardly directed angles relative to the horizontal to impinge upon the upper portions of the plants, said housing means of said blower means being vertically mounted upon said vehicle means such that said air inlet opening is at the top end of said housing means thereby minimizing the possibility that dirt or other debris suspended in the air above the ground level as a result of said air blast will be drawn into the blower means and blown against the plants being sprayed.

16. An apparatus as set forth in claim 15 wherein said inlet opening lies in a generally horizontal plane and opens vertically upwardly so that air is drawn into said blower means from directly over said blower means.

* * * * *